(12) United States Patent
Kohli et al.

(10) Patent No.: US 10,731,474 B2
(45) Date of Patent: Aug. 4, 2020

(54) AIRFOIL WITH VARYING WALL THICKNESS

(71) Applicant: United Technologies Corporation, Farmington, CT (US)

(72) Inventors: Atul Kohli, Tolland, CT (US); Jaime G. Ghigliotty, Cabo Rojo, PR (US); James B. Downey, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 169 days.

(21) Appl. No.: 16/003,755

(22) Filed: Jun. 8, 2018

(65) Prior Publication Data

US 2019/0271230 A1    Sep. 5, 2019

Related U.S. Application Data

(60) Provisional application No. 62/637,713, filed on Mar. 2, 2018.

(51) Int. Cl.
*F01D 5/18* (2006.01)
*F02C 3/04* (2006.01)
*F01D 9/04* (2006.01)

(52) U.S. Cl.
CPC ............... *F01D 5/186* (2013.01); *F02C 3/04* (2013.01); *F01D 5/187* (2013.01); *F01D 9/041* (2013.01);

(Continued)

(58) Field of Classification Search
CPC .................................. F01D 5/186; F01D 5/187
See application file for complete search history.

(56) References Cited

U.S. PATENT DOCUMENTS

| 3,240,468 A | * | 3/1966 | Watts | F01D 5/183 |
|---|---|---|---|---|
| | | | | 415/117 |
| 3,647,316 A | * | 3/1972 | Moskowitz | F01D 5/183 |
| | | | | 416/97 R |

(Continued)

FOREIGN PATENT DOCUMENTS

| EP | 0896127 | 2/1999 |
|---|---|---|
| EP | 1898051 | 3/2008 |

(Continued)

OTHER PUBLICATIONS

European Search Report for European Patent Application No. 19160627.6 completed Apr. 16, 2019.

*Primary Examiner* — Ninh H. Nguyen
*Assistant Examiner* — Ehnoush Haghighian
(74) *Attorney, Agent, or Firm* — Carlson, Gaskey & Olds, P.C.

(57) ABSTRACT

An airfoil includes an airfoil body that has a peripheral wall that defines an exterior side and an interior side that bounds an internal cavity in the airfoil body. The peripheral wall has first and second wall sections joined by a transition section. The first wall section is thicker than the second wall section. The transition section provides a change in thickness between the first wall section and the second wall section. The second wall section includes a cooling hole that has a first end that opens to the internal cavity at the interior side and a second end that opens to the exterior side.

16 Claims, 2 Drawing Sheets

(52) U.S. Cl.
CPC .... *F05D 2220/323* (2013.01); *F05D 2240/24* (2013.01); *F05D 2260/201* (2013.01); *F05D 2260/202* (2013.01); *F05D 2260/204* (2013.01)

(56) References Cited

U.S. PATENT DOCUMENTS

| | | | | |
|---|---|---|---|---|
| 5,342,172 | A * | 8/1994 | Coudray | F01D 5/186 |
| | | | | 416/95 |
| 5,720,431 | A * | 2/1998 | Sellers | F01D 5/186 |
| | | | | 416/97 R |
| 5,931,638 | A * | 8/1999 | Krause | F01D 5/186 |
| | | | | 415/115 |
| 7,377,746 | B2 * | 5/2008 | Brassfield | B22C 9/043 |
| | | | | 29/888.024 |
| 7,780,413 | B2 * | 8/2010 | Liang | F01D 5/188 |
| | | | | 416/97 R |
| 7,946,815 | B2 * | 5/2011 | Liang | F01D 5/186 |
| | | | | 416/97 R |
| 8,591,190 | B2 * | 11/2013 | Tibbott | F01D 5/187 |
| | | | | 416/97 R |
| 9,797,261 | B2 * | 10/2017 | Tibbott | F01D 5/188 |
| 9,863,254 | B2 | 1/2018 | Ceglio et al. | |
| 9,963,982 | B2 * | 5/2018 | Zelesky | F01D 5/186 |
| 10,260,352 | B2 * | 4/2019 | Campbell | B22D 19/10 |
| 10,364,681 | B2 * | 7/2019 | Krumanaker | F01D 5/187 |
| 2008/0095622 | A1 * | 4/2008 | Naik | F01D 5/186 |
| | | | | 416/97 R |
| 2010/0254801 | A1 * | 10/2010 | Tibbott | F01D 5/186 |
| | | | | 415/115 |
| 2011/0097188 | A1 * | 4/2011 | Bunker | F01D 5/186 |
| | | | | 415/1 |
| 2014/0093392 | A1 * | 4/2014 | Tibbott | F01D 5/189 |
| | | | | 416/97 R |
| 2015/0184519 | A1 * | 7/2015 | Foster | F01D 5/187 |
| | | | | 416/96 R |
| 2017/0107825 | A1 * | 4/2017 | Krumanaker | F01D 5/187 |
| 2017/0107829 | A1 * | 4/2017 | Krumanaker | F01D 5/187 |
| 2018/0073373 | A1 * | 3/2018 | Paquin | F01D 5/18 |
| 2018/0135430 | A1 * | 5/2018 | Weber | B22C 9/108 |
| 2019/0211693 | A1 * | 7/2019 | Rollinger | F01D 5/187 |

FOREIGN PATENT DOCUMENTS

| | | |
|---|---|---|
| EP | 2204538 | 7/2010 |
| EP | 3323528 | 5/2018 |
| GB | 2523140 | 8/2015 |
| WO | 2009087346 | 7/2009 |
| WO | 2018189434 | 10/2018 |

* cited by examiner

AIRFOIL WITH VARYING WALL THICKNESS

STATEMENT REGARDING FEDERALLY SPONSORED RESEARCH OR DEVELOPMENT

This invention was made with government support under Contract No. DE-FE0025011 awarded by the Department of Energy. The Government has certain rights in this invention.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil body that has a peripheral wall that defines an exterior side and an interior side that bounds an internal cavity in the airfoil body. The peripheral wall has first and second wall sections joined by a transition section. The first wall section is thicker than the second wall section. The transition section provides a change in thickness between the first wall section and the second wall section, and the second wall section has a cooling hole that has a first end that opens to the internal cavity at the interior side and a second end that opens to the exterior side.

In a further embodiment of any of the foregoing embodiments, the first wall section is a double wall.

In a further embodiment of any of the foregoing embodiments, the first wall section includes an embedded cooling passage.

In a further embodiment of any of the foregoing embodiments, the embedded cooling passage includes flow members.

In a further embodiment of any of the foregoing embodiments, the first wall section is thicker than the second wall section by a factor of at least 2.

In a further embodiment of any of the foregoing embodiments, the cooling hole is sloped.

In a further embodiment of any of the foregoing embodiments, the transition section includes a sloped wall, the cooling hole extends along a central cooling hole axis, and the central cooling hole axis is substantially parallel to the sloped wall.

In a further embodiment of any of the foregoing embodiments, the transition section includes an overhang.

In a further embodiment of any of the foregoing embodiments, the cooling hole has a length-to-diameter ratio from 2 to 10.

In a further embodiment of any of the foregoing embodiments, the length-to-diameter ratio is about 6.

In a further embodiment of any of the foregoing embodiments, the transition section has an overhang. The first wall section is thicker than the second wall section by a factor of at least 2. The cooling hole is sloped, and the cooling hole has a length-to-diameter ratio of about 6.

A gas turbine engine according to an example of the present disclosure includes a compressor section, a combustor in fluid communication with the compressor section, and a turbine section in fluid communication with the combustor. The turbine section has a turbine airfoil that includes an airfoil body that has a peripheral wall that defines an exterior side and an interior side that bounds an internal cavity in the airfoil body. The peripheral wall has first and second wall sections joined by a transition section. The first wall section is thicker than the second wall section. The transition section provides a change in thickness between the first wall section and the second wall section, and the second wall section has a cooling hole that has a first end that opens to the internal cavity at the interior side and a second end that opens to the exterior side.

In a further embodiment of any of the foregoing embodiments, the first wall section is a double wall.

In a further embodiment of any of the foregoing embodiments, the first wall section includes an embedded cooling passage.

In a further embodiment of any of the foregoing embodiments, the embedded cooling passage includes flow members.

In a further embodiment of any of the foregoing embodiments, the first wall section is thicker than the second wall section by a factor of at least 2.

In a further embodiment of any of the foregoing embodiments, the cooling hole is sloped, the cooling hole extends along a central cooling hole axis, the transition section includes a sloped wall, and the central cooling hole axis is substantially parallel to the sloped wall.

In a further embodiment of any of the foregoing embodiments, the transition section includes an overhang.

In a further embodiment of any of the foregoing embodiments, the transition section includes an overhang. The first wall section is thicker than the second wall section by a factor of at least 2. The cooling hole is sloped, and the cooling hole has a length-to-diameter ratio of about 6.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
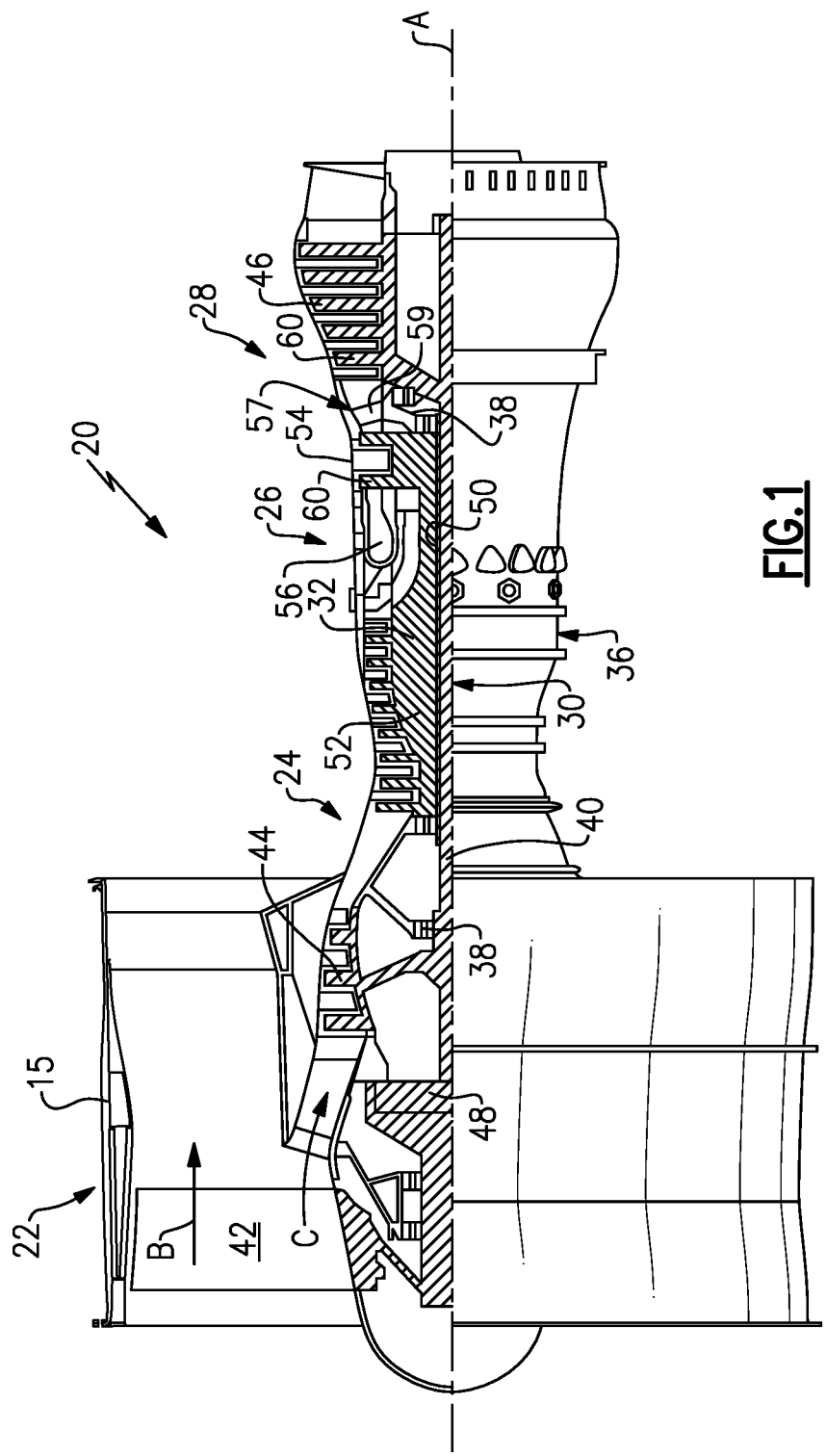
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

Figure 2:
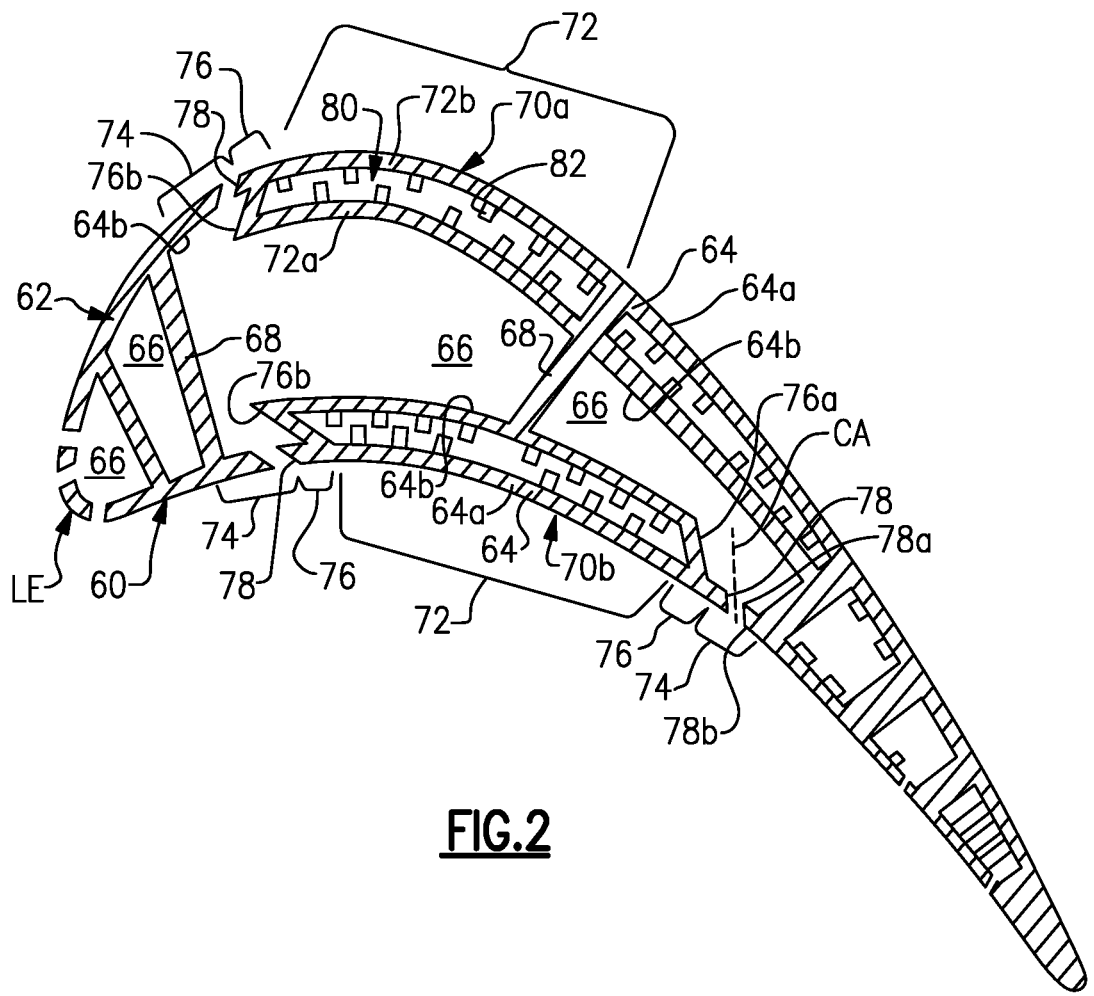
FIG. 2 illustrates an example airfoil of the gas turbine engine.

FIG. 2 illustrates a sectioned view of a representative example an airfoil 60 from the turbine section 28. The airfoil 60 may be in the low pressure turbine section 46 or the high pressure turbine section 54. The illustrated example is a rotatable airfoil blade, however, it is to be understood that the examples herein are also applicable to static turbine vanes.

The airfoil 60 includes an airfoil body 62. In general, the airfoil body 62 has a wing-like shape to provide a reaction force via Bernoulli's principle with regard to airflow over the airfoil 60. As will be appreciated, the airfoil body 62 may additionally include other portions, such as a blade root or one or more platforms.

The airfoil body 62 includes a peripheral wall 64 that defines an exterior side 64a and an interior side 64b that bounds an internal cavity 66 in the airfoil body 62. Peripheral walls are walls that define the outer perimeter of the airfoil body 62, as opposed to internal walls, such as ribs. In this example, the peripheral wall 64 bounds several internal cavities, which are each designated 66, that are separated by ribs 68 that span and connect opposed sides of the peripheral wall 64.

The peripheral wall 64 defines a leading end (LE), and trailing end (TE), and first and second sides 70a/70b that meet at the leading end and trailing end. The first side 70a is generally convex and may also be considered to be a suction side, and the second side 70b is concave and may also be considered to be a pressure side.

The peripheral wall 64 has a first wall section 72, a second wall section 74, and a transition section 76 that joins the first and second wall sections 72/74. In this example, the airfoil body 62 includes multiple first wall sections 72, multiple second wall sections 74, and multiple transition sections 76. Multiple sections 72/74/76 are shown here to demonstrate various features of the examples, however, it is to be understood that the number of sections 72/74/76 can be varied and that the various features can be used in different combinations.

The first wall section 72 is thicker than the second wall section 74. For example, first wall section 72 is thicker than the second wall section 74 by a factor of at least 2 and, in some examples, may be thicker by a factor of up to about 8. The thickness refers to the linear distance from the exterior side 64a to the interior side 64b. For example, each of the first wall section 72 and the second wall section 74 have substantially uniform thicknesses.

In the illustrated example, the first wall section 72 is a double wall that includes an inner sub-wall 72a and an outer sub-wall 72b that are separated by a narrow cooling passage 80. In this example, the cooling passage 80 includes flow members 82. For instance, the flow members 82 are pedestals, however, the flow members 82 may additionally or alternatively include flow turbulators or other features that influence airflow in the cooling passage 80.

In some examples, as shown, the cooling passage 80 is an embedded passage. Such an embedded cooling passage may be referred to as a mini-core passage, because it is formed in an investment casting process by small investment cores that result in the formation of micro-passages in the walls. In general, these micro-passages are longer and wider than they are thick. As an example, the mini-core passage may have an entrance manifold to receive cooling air from the internal cavity 66 or from a base or root region of the airfoil 60, a diffuser orifice that opens to the exterior surface 64a, and a bank of sub-passages that fluidly connect the entrance manifold with the diffuser orifice. Example mini-core passages are shown and described in U.S. Pat. No. 7,600,966.

In general, the first wall section 72 is thicker than the second wall section 74 in order to accommodate the presence of the cooling passage 80. However, in one modified example, rather than including the cooling passage 80, the first wall section 72 is solid and thus excludes embedded cooling passages.

The transition section 76 provides a change in thickness between the first wall section 72 and the second wall section 74, and the second wall section 74 includes a cooling hole 78. The cooling hole 78 has a first end 78a that opens to the internal cavity 66 at the interior side 64b and a second end 78b that opens to the exterior side 64a. In this example, the ends 78a/78b are offset such that a central axis CA of the cooling hole 78 is sloped. That is, the cooling hole 78 is sloped relative to a direction that is perpendicular to the exterior side 64a at the intersection with the central axis CA. The slope of the cooling hole 78 facilitates the discharge of cooling air as a cooling film along the exterior surface 64a, rather than jetting the cooling air into the core airflow.

Figure 3:
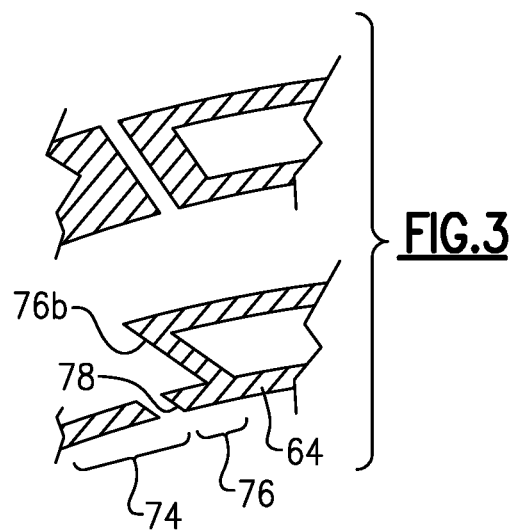
FIG. 3 shows a comparative view of a thinned wall section and a thicker wall section.

The transition section 76 provides a local thinning of the peripheral wall 64 such that the cooling hole 78 can be shorter than it otherwise would be if the peripheral wall 64 were not thinned. For example, the cooling hole 78 has a length-to-diameter ratio from 2 to 10, and in some examples may have a length-to-diameter ratio of about 6. However, if the peripheral wall 64 were not thinned, and instead continued at the thickness of the first wall section 72 (as represented in the top comparative view in FIG. 3), the cooling hole 78 would need to be longer. Cooling bleed air (from the compressor section) that flows through a cooling hole interacts with the sides of the hole, thereby frictionally heating and becoming less effective for film cooling. By thinning the first wall section 72 by way of the transition section 76 to the thinner second wall section 74 where the cooling hole 78 is located (as also shown in the bottom view in FIG. 3), the cooling hole 78 can have a length-to-diameter ratio that reduces frictional heating. Put another way, if the second wall section 74 were not thinned, the cooling hole 78 would need to be longer and thus would have a greater a length-to-diameter ratio assuming the diameter remained the same. Alternatively, if the same length-to-diameter ratio as in the thinned second wall section 74 were used in a thicker wall section, the diameter would be larger and thus allow increased cooling bleed air flow, which would penalize engine efficiency.

The illustrated airfoil body 62 includes several different types of the transition sections 78. It is to be understood that a particular implementation of this disclosure need not include each type, and that each type may be used individually. One example of a first type of transition section is where the transition section 76 is aft of the first wall section 72. In that case, the transition section 76 includes a sloped wall 76a. The sloped wall 76a and the central axis of the immediately adjacent cooling hole 78 may be substantially parallel. In one example, the sloped wall 76a and the central axis are parallel within 3°, within 5°, or within 5° to 10°. The parallel relationship may facilitate the funneling and guidance of airflow from the transition section 76 to the cooling hole 78, as well as reducing wall axial length and aiding fabrication by clearing the region for drilling of the cooling hole 78. The cooling hole 78 may otherwise need to be displaced further aft, which could be a less effective location for cooling.

An example of a second type of transition section is where the transition section 76 is forward of the first wall section 72. In that case, the transition section 76 includes an overhang 76b. In the example airfoil body 62 there are two such overhangs 76b, which are directly opposite each other. The overhang 76b is a portion of the transition section 76 that projects out over the first end 78a of the cooling passage 78. Like the sloped wall 76a, the overhang 76b may also be parallel with the central axis of the immediately adjacent cooling hole 78. The overhang 76b may also facilitate cooling. The cooling holes 78 may be fed from the cavity 66 to enhance film effectiveness. The cavity 66 is insulated from the hot walls to avoid heating the cooling air. The thinned wall of the second wall section 74 is between the cavity 66 and the cooling passages 80 of the first wall section 72 to maintain the cooling hole 78 length and avoid excessive cooling temperature heat-up for optimum film effectiveness. As a result, drilling the holes here produces the overhang 76b.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
    an airfoil body having a peripheral wall that defines an exterior side and an interior side that bounds an internal cavity in the airfoil body, the peripheral wall having first and second wall sections joined by a transition section, wherein the first wall section is thicker than the second wall section, the transition section providing a change in thickness between the first wall section and the second wall section, and the second wall section including a cooling hole next to the transition section and having a first end that opens to the internal cavity at the interior side and a second end that opens to the exterior side, the transition section including an overhang projecting out over the first end of the cooling hole, the overhang including a wall that is parallel with a central axis of the cooling hole.

2. The airfoil as recited in claim 1, wherein the first wall section is a double wall.

3. The airfoil as recited in claim 1, wherein the first wall section includes an embedded cooling passage.

4. The airfoil as recited in claim 3, wherein the embedded cooling passage includes pedestals.

5. The airfoil as recited in claim 1, wherein the first wall section is thicker than the second wall section by a factor of at least 2.

6. The airfoil as recited in claim 1, wherein the cooling hole has a length-to-diameter ratio from 2 to 10.

7. The airfoil as recited in claim 1, wherein the first wall section is thicker than the second wall section by a factor of at least 2, the cooling hole is sloped, and the cooling hole has a length-to-diameter ratio from 2 to 10.

8. A gas turbine engine comprising:
a compressor section;
a combustor in fluid communication with the compressor section; and
a turbine section in fluid communication with the combustor,
the turbine section having a turbine airfoil that includes,
an airfoil body having a peripheral wall that defines an exterior side and an interior side that bounds an internal cavity in the airfoil body, the peripheral wall having first and second wall sections joined by a transition section, wherein the first wall section is thicker than the second wall section, the transition section providing a change in thickness between the first wall section and the second wall section, and the second wall section including a cooling hole next to the transition section and having a first end that opens to the internal cavity at the interior side and a second end that opens to the exterior side, the transition section including an overhang projecting out over the first end of the cooling hole, the overhang including a wall that is parallel with a central axis of the cooling hole.

9. The gas turbine engine as recited in claim 8, wherein the first wall section is a double wall.

10. The gas turbine engine as recited in claim 8, wherein the first wall section includes an embedded cooling passage.

11. The gas turbine engine as recited in claim 10, wherein the embedded cooling passage includes pedestals.

12. The gas turbine engine as recited in claim 8, wherein the first wall section is thicker than the second wall section by a factor of at least 2.

13. The gas turbine engine as recited in claim 8, wherein the first wall section is thicker than the second wall section by a factor of at least 2, and the cooling hole has a length-to-diameter ratio from 2 to 10.

14. The airfoil as recited in claim 1, wherein the airfoil body includes a leading end and a trailing end, the internal cavity is divided from the leading end toward the trailing end into a forward-most sub-cavity, following by a second sub-cavity, following by a third sub-cavity, and the first end of the cooling hole opens to the third sub-cavity.

15. The airfoil as recited in claim 14, wherein the first end of the cooling hole is next to a rib that divides the second sub-cavity from the third sub-cavity.

16. The airfoil as recited in claim 15, wherein the overhang projects toward the leading end of the airfoil body.

\* \* \* \* \*